United States Patent
Mikami

(12) 
(10) Patent No.: US 8,767,275 B2
(45) Date of Patent: Jul. 1, 2014

(54) STATIONARY SCANNER APPARATUS WITH IMAGE SCANNER

(71) Applicant: NEC Infronia Corporation, Kawasaki (JP)

(72) Inventor: Hayato Mikami, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/754,529

(22) Filed: Jan. 30, 2013

(65) Prior Publication Data

US 2014/0029069 A1    Jan. 30, 2014

(30) Foreign Application Priority Data

Jul. 26, 2012  (JP) ................. 2012-165407

(51) Int. Cl.
*H04N 1/04*         (2006.01)
(52) U.S. Cl.
USPC .......................................... 358/497; 358/474
(58) Field of Classification Search
USPC ................................................. 358/474, 497
See application file for complete search history.

(56) References Cited

U.S. PATENT DOCUMENTS 6,427,288 B1    8/2002   Saito

FOREIGN PATENT DOCUMENTS

| JP | 5-30539 U | 4/1993 |
|----|-----------|--------|
| JP | 2695468 B2 | 12/1997 |
| JP | 2001-20941 A | 1/2001 |
| JP | 2009-075784 A | 4/2009 |

OTHER PUBLICATIONS

Office Action, dated Feb. 6, 2013, issued by the Japanese Patent Office in counterpart Japanese Patent Application No. 2012-282973.

*Primary Examiner* — Charlotte M Baker
*Assistant Examiner* — Rury Grisham
(74) *Attorney, Agent, or Firm* — Sughrue Mion, PLLC

(57) ABSTRACT

A stationary scanner apparatus 10 comprises an image scanner 20 operable to read an item code, an imager attachment member 30 fixed to the image scanner 20, a support frame 40 configured to support the imager attachment member 30 in a state in which the image scanner 20 and imager attachment member 30 are rotatable about a horizontal axis with respect to the support frame 40, and a support portion 83 fixed to the support frame 40. The imager attachment member 30 has a first plate-shaped inclination holder 32a formed on one side of lateral sides of the imager attachment member 30 and a second plate-shaped inclination holder 32b formed on another side of the lateral sides of the imager attachment member 30. The support frame 40 has a first plate-shaped guide member 42a arranged in contact with the first inclination holder 32a and a second plate-shaped guide member 42b arranged in contact with the second inclination holder 32b. A rotational position of the image scanner 20 is held with a frictional force produced between the inclination holders 32a, 32b and the guide members 42a, 42b.

3 Claims, 7 Drawing Sheets

STATIONARY SCANNER APPARATUS WITH IMAGE SCANNER

This application is based upon and claims the benefit of priority from Japanese patent application No. 2012-165407, filed on Jul. 26, 2012, the disclosure of which is incorporated herein in its entirety by reference.

BACKGROUND

1. Field of the Invention

The present invention relates to a stationary scanner apparatus with an image scanner, and more particularly to a stationary scanner apparatus with an image scanner having a readable area that is movable in a vertical direction.

2. Description of the Related Art

Generally, in a point-of-sales (POS) system, a store clerk conducts an item registration operation of registering items to be purchased by customers, and another store clerk conducts a checkout operation. A stationary scanner apparatus is used for an item registration operation. Some stationary scanner apparatuses use what is called an image scanner, which reads a bar code of an item with an imager such as a charge-coupled device (CCD) image sensor.

An image scanner has a narrower readable area as compared to a laser scanner. Therefore, a stationary scanner apparatus with an image scanner needs to have a mechanism for moving a readable area of the image scanner in a vertical direction so that an operator can conduct a reading operation at his/her optimal height.

Conventional examples of a stationary scanner apparatus having a mechanism for moving a readable area of an image scanner in a vertical direction include a bar code scanner having an area image sensor such as a CCD image pickup device with a lifting mechanism capable of changing the height of a bar code reader itself. See, e.g., JP-A 2009-075784 (Patent Literature 1).

The bar code scanner disclosed in Patent Literature 1 slides a bar code reader itself along guide grooves formed in a pair of support members to move the bar code reader in a vertical direction. Therefore, the weight of the bar code reader needs to be supported at each point in the vertical direction. Thus, the structure of the scanner is complicated and is large in size. Accordingly, such a bar code scanner becomes costly.

Furthermore, the bar code scanner disclosed in Patent Literature 1 requires a movement space for ensuring the vertical movement of the bar code reader itself. Such a movement space is provided only for moving the bar code reader in the vertical direction. Therefore, it is difficult to use the movement space for placing a basket or the like, for example. Thus, such a bar code scanner also has a problem in effective use of spaces around the scanner.

SUMMARY

The present invention has been made in view of the conventional drawbacks. It is, therefore, an object of the present invention to provide a stationary scanner apparatus that can achieve simplification in structure of the apparatus and size reduction of the apparatus and allows spaces around the apparatus to effectively be utilized.

According to an exemplary aspect of the present invention, there is provided a stationary scanner apparatus comprising: an image scanner operable to read an item code; an imager attachment member fixed to the image scanner; a support frame configured to support the imager attachment member in a state in which the image scanner and imager attachment member are rotatable about a horizontal axis with respect to the support frame; and a support portion fixed to the support frame, wherein the imager attachment member has a first plate-shaped inclination holder formed on one side of lateral sides of the imager attachment member and a second plate-shaped inclination holder formed on another side of the lateral sides of the imager attachment member, wherein the support frame has a first plate-shaped guide member arranged in contact with the first inclination holder and a second plate-shaped guide member arranged in contact with the second inclination holder, wherein a rotational position of the image scanner is held with a frictional force produced between the inclination holders and the guide members.

According to the present invention, the image scanner is supported so that the image scanner is rotatable about a horizontal axis. Thus, a readable area of the image scanner can be moved in a vertical direction by rotating the image scanner. Therefore, a stationary scanner apparatus according to the present invention can achieve simplification in structure of the apparatus and size reduction of the apparatus without any lifting mechanism, which would be likely to increase the complexity and the size of the structure of the apparatus. Accordingly, the cost of the apparatus can be reduced.

Also, according to the present invention, the image scanner itself is not moved in the vertical direction. Therefore, a space located below the image scanner can be used for other purposes, for example, for placing a basket or the like. Thus, spaces around the apparatus can effectively be utilized.

Furthermore, according to the present invention, it is possible to held the image scanner at any position of rotational position of the image scanner with a frictional force produced between the inclination holders and the guide members.

DETAILED DESCRIPTION OF THE PREFERRED EMBODIMENTS

An embodiment of a stationary scanner apparatus according to the present invention will be described below with reference to FIGS. 1 to 7.

A stationary scanner apparatus 10 according to an embodiment of the present invention is used for an item registration operation in a POS system in which a store clerk conducts an item registration operation of registering items to be purchased by customers while another store clerk conducts a checkout operation.

Figure 1:
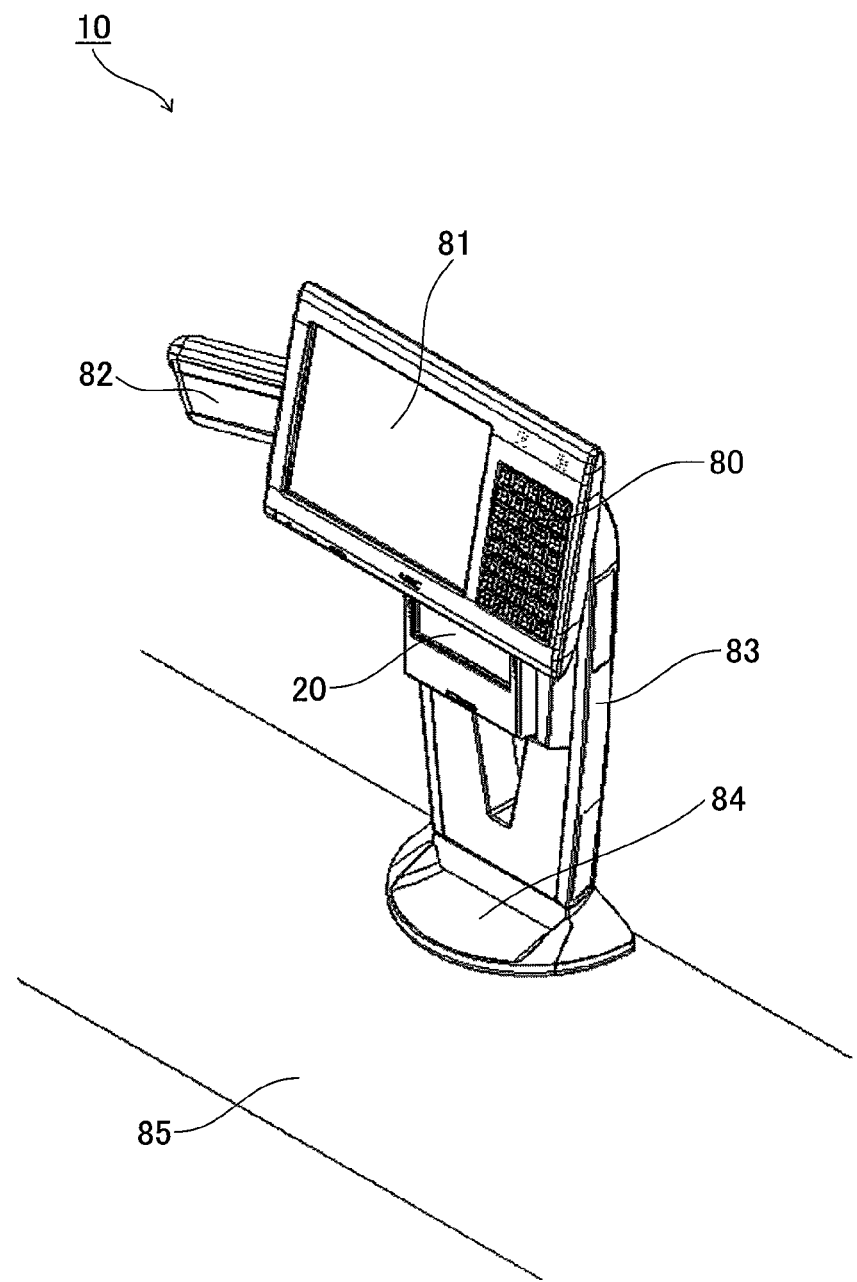
FIG. 1 is a perspective view showing a stationary scanner apparatus according to an embodiment of the present invention.

As shown in FIG. 1, the stationary scanner apparatus 10 has an image scanner 20 such as a CCD image sensor capable of reading an item code assigned to an item, a keyboard 80 that receives various inputs, a store clerk display 81 with a touch panel, a customer display 82, a support member (support portion) 83 for supporting those components, and a towel reception portion 84 for receiving a towel therein. The reference numeral 85 of FIG. 1 represents a bagger stand (mount stand) on which the stationary scanner apparatus 10 is mounted.

Figure 2:
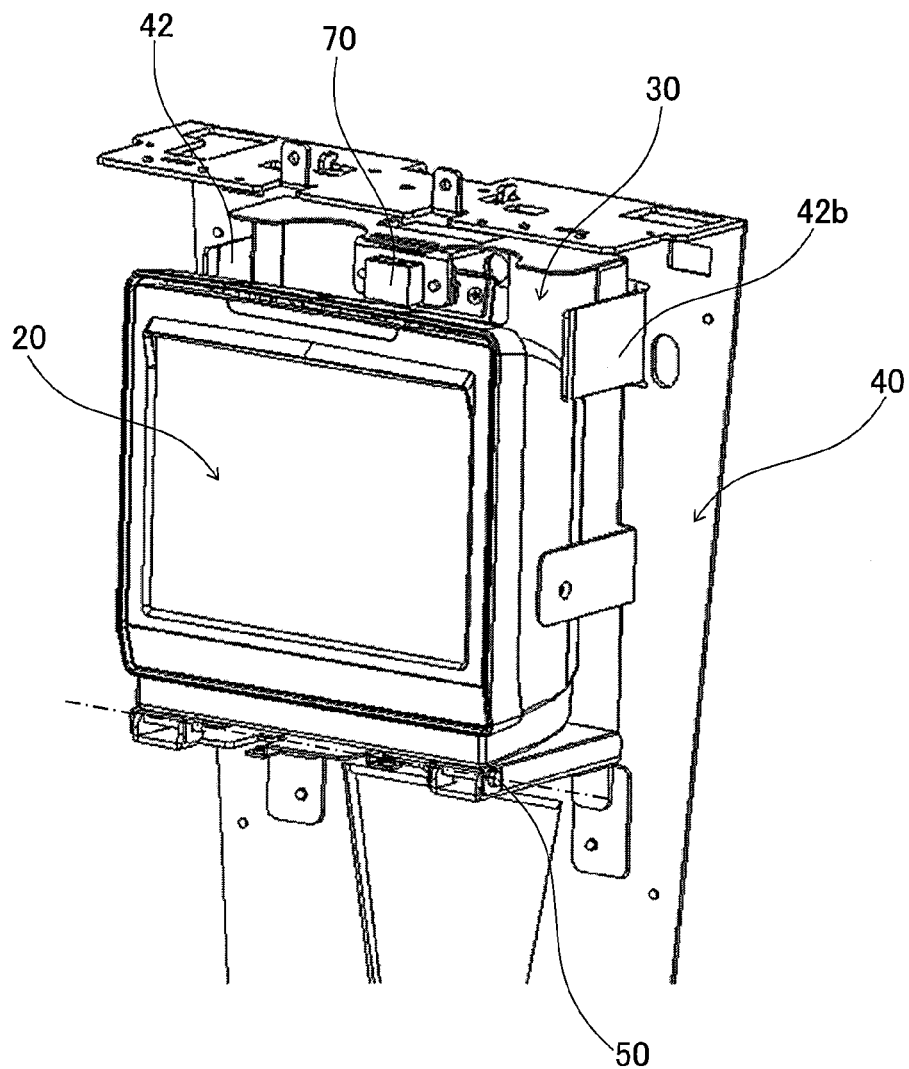
FIG. 2 is a perspective view primarily showing an image scanner, an imager attachment member, and a support frame of the stationary scanner apparatus.
Figure 3:
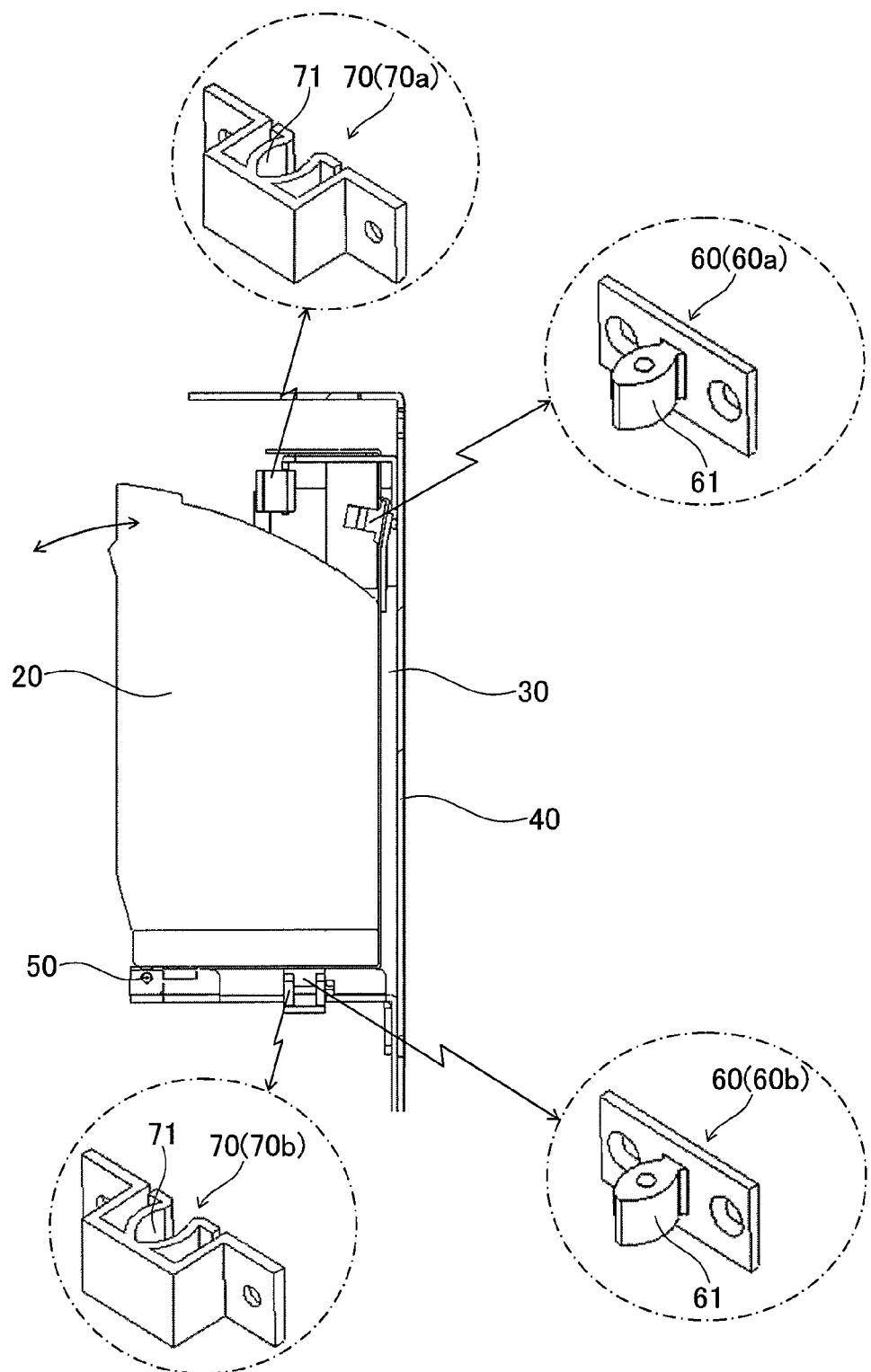
FIG. 3 is a cross-sectional view primarily showing the image scanner, the imager attachment member, and the support frame along with enlarged perspective views of first engagement members and second engagement members.

As shown in FIGS. 2 and 3, the image scanner 20 is housed in an imager attachment member 30 in a fixed manner. A support frame 40 is fixed within the support member (support portion) 83. The support frame 40 supports the imager attachment member 30 in a state in which the imager attachment member 30 is rotatable about an axial member 50 as a rotation axis. With the imager attachment member 30 and the support frame 40, the image scanner 20 is attached to the support member (support portion) 83 in a state in which the image scanner 20 is rotatable about the horizontal axis. In FIG. 3, an internal structure of the image scanner 20 is omitted from the illustration.

Figure 4:
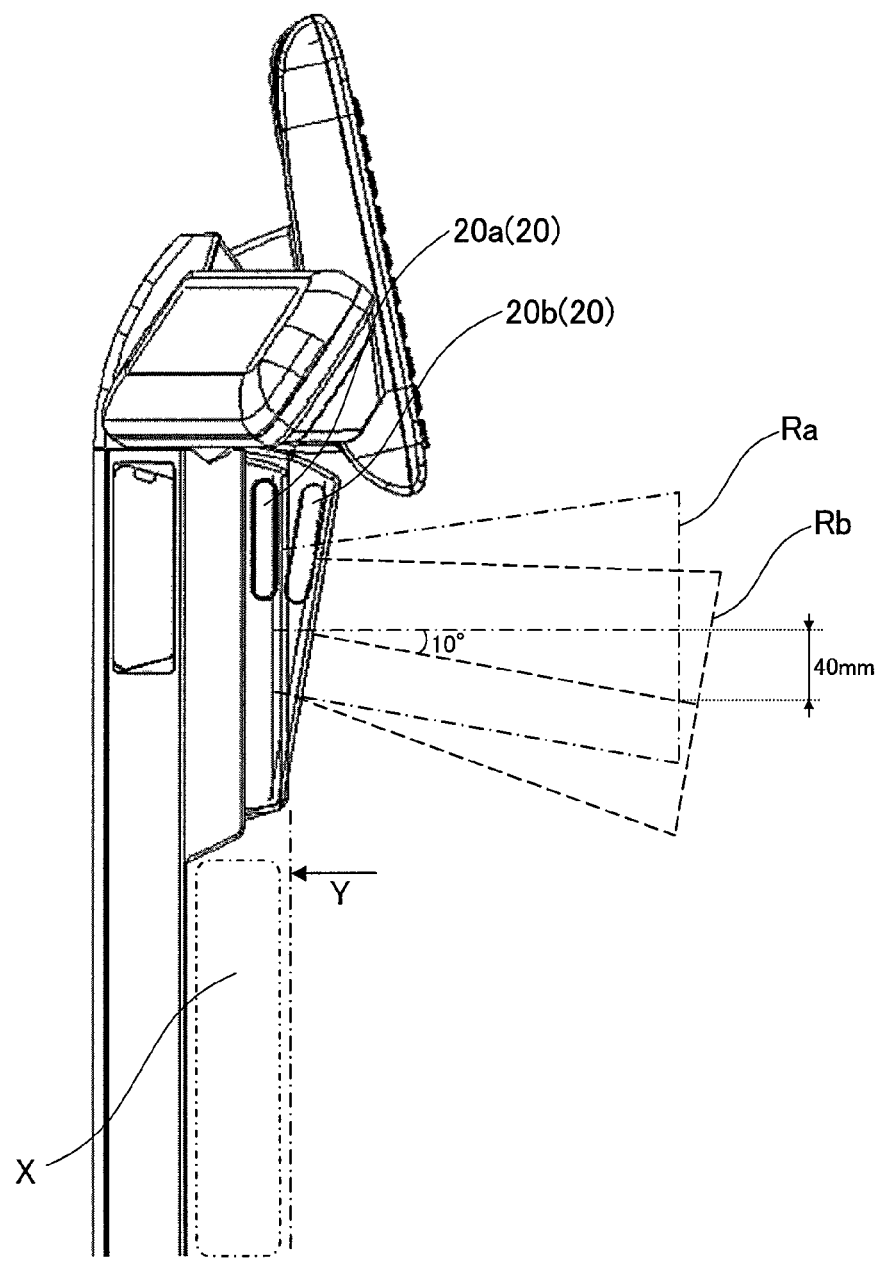
FIG. 4 is a diagram explanatory of a readable area and space utilization around the apparatus when the image scanner is rotated.
Figure 5:
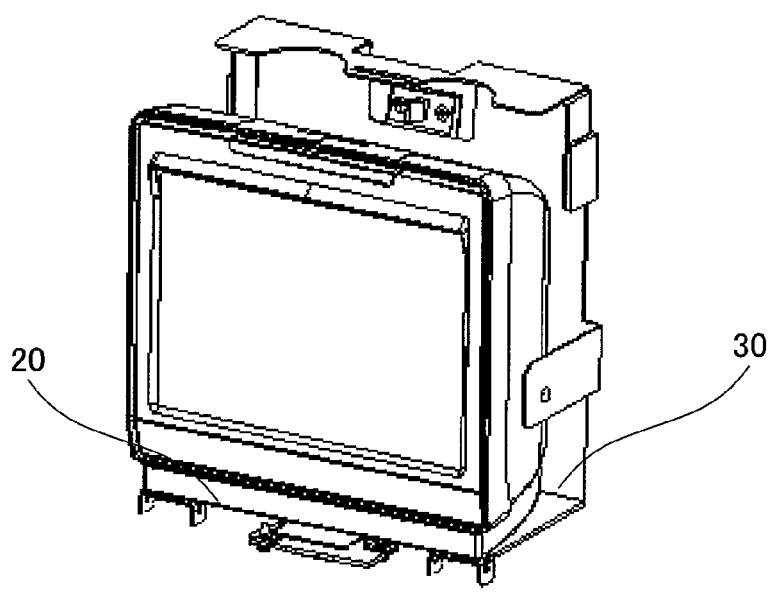
FIG. 5 is a perspective view showing the image scanner that has been attached to the imager attachment member.

In this embodiment, as shown in FIG. 4, the image scanner 20 can be rotated within an angular range of about 10 degrees. When the rotatable range of the image scanner 20 is thus set to be 10 degrees, the readable area of the image scanner 20 can be moved in the vertical direction by about 40 mm The rotatable range of the image scanner 20 is not limited to the above example of 10 degrees and may be more than 10 degrees.

The reference numeral 20a in FIG. 4 denotes the image scanner 20 that has not been rotated (i.e., the image scanner 20 that has been rotated into the furthest rear position in the rotational direction). The reference sign Ra in FIG. 4 denotes the readable area of the image scanner 20a. The reference numeral 20b in FIG. 4 denotes the image scanner 20 that has been rotated frontward through about 10 degrees (i.e., the image scanner 20 that has been rotated into the furthest front position in the rotational direction). The reference sign Rb in FIG. 4 denotes the readable area of the image scanner 20b.

The stationary scanner apparatus 10 of this embodiment has a mechanism for holding the image scanner 20 at any position within an angular range of 0 degree to 10 degrees. Such a mechanism will be described below.

Figure 6:
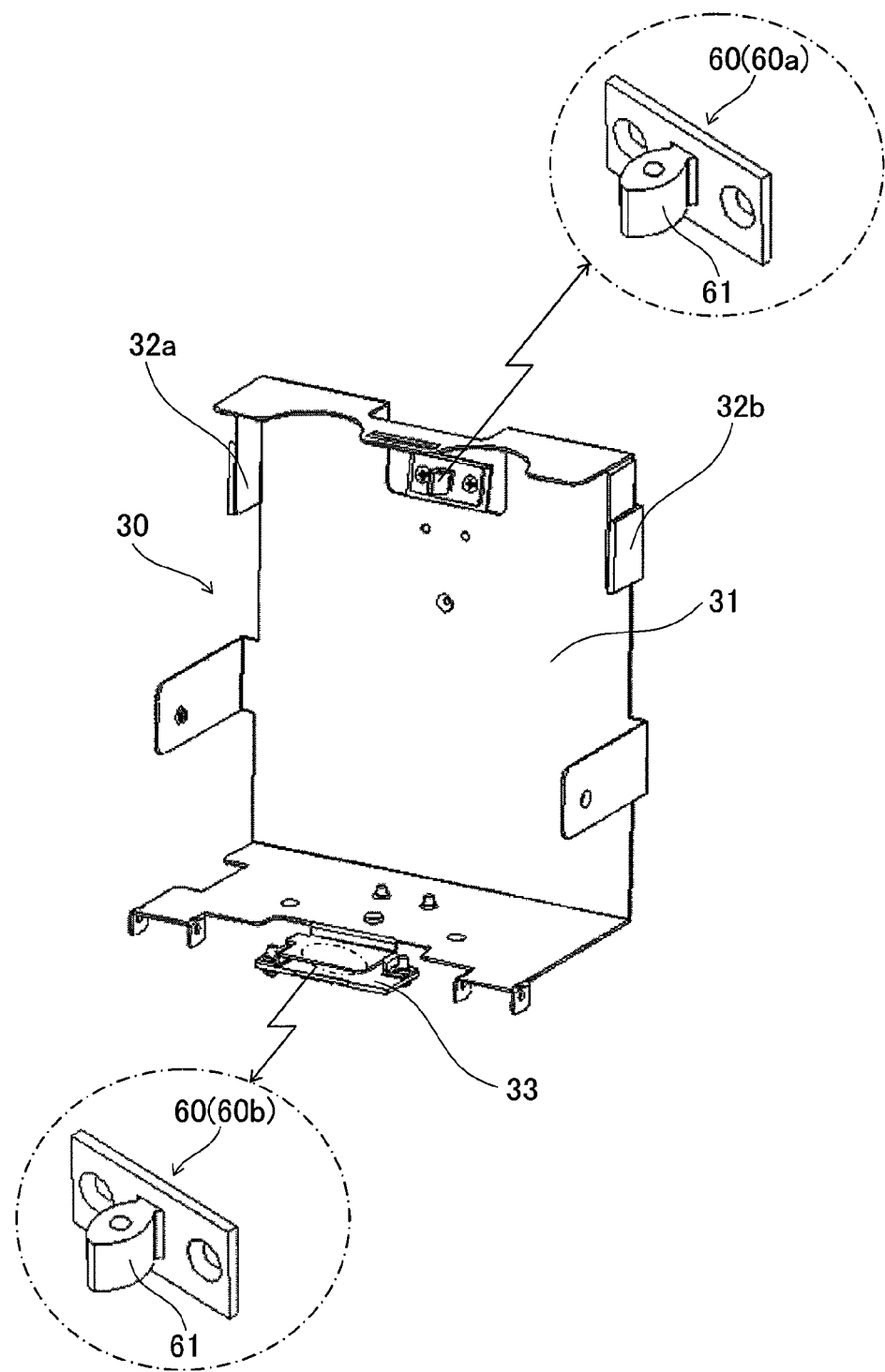
FIG. 6 is a perspective view showing the imager attachment member along with enlarged perspective views of the first engagement members.

As shown in FIG. 6, the imager attachment member 30 has a body plate 31, a first plate-shaped inclination holder 32a, and a second plate-shaped inclination holder 32b. The first inclination holder 32a is formed on one side of lateral sides of the body plate 31. The second inclination holder 32b is formed on another side of lateral sides of the body plate 31. The inclination holders 32a, 32b have outer side surfaces that are brought into contact with guide members 42, which will be described later. Resilient parts that produce large frictional forces on their surfaces are attached to those outer side surfaces of the inclination holders 32a, 32b.

Figure 7:
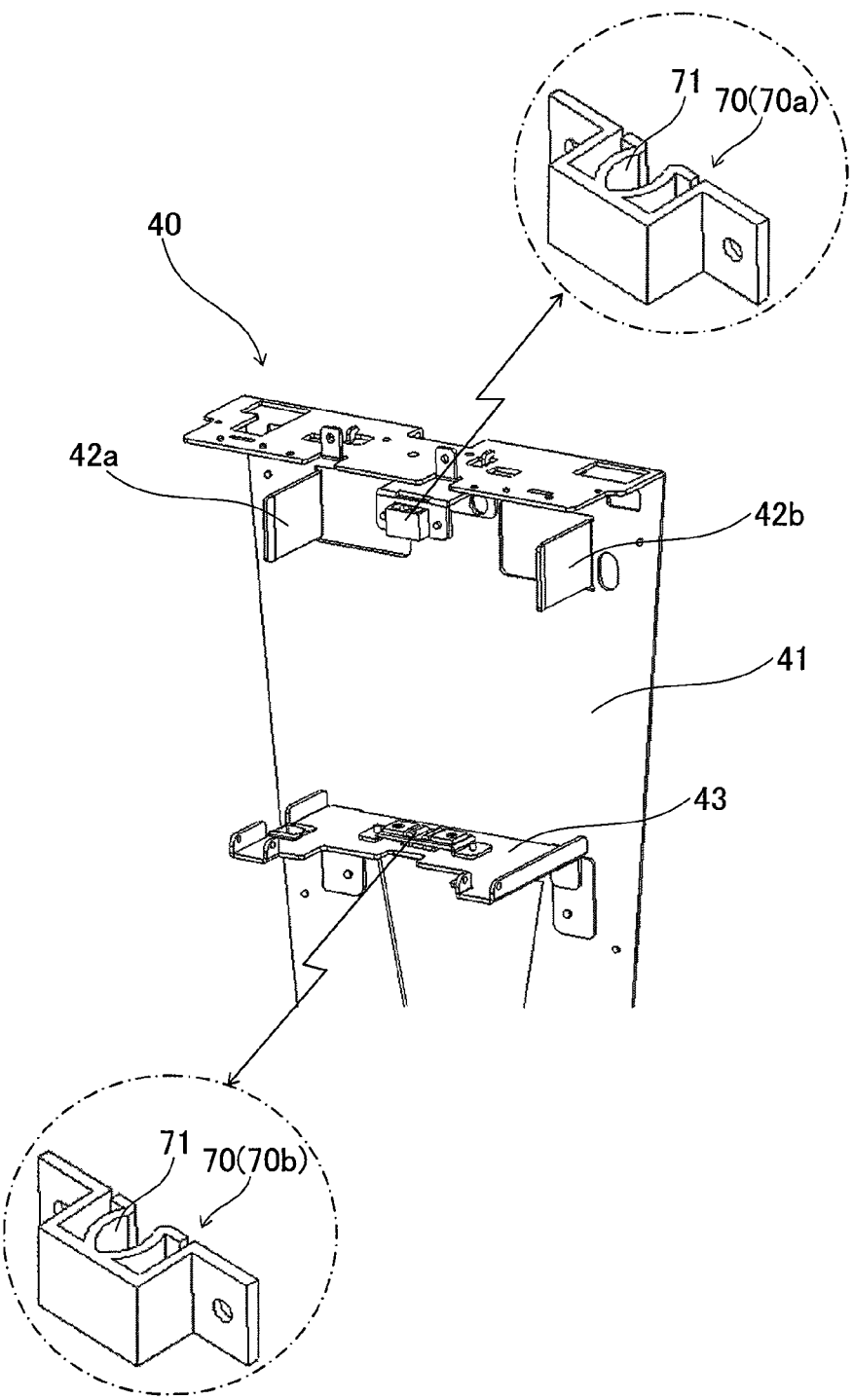
FIG. 7 is a perspective view showing the support frame along with enlarged perspective views of the second engagement members.

As shown in FIG. 7, the support frame 40 has a frame body plate 41, a first plate-shaped guide member 42a, and a second plate-shaped guide member 42b. The first guide member 42a projects frontward from the frame body plate 41 at one side of lateral sides of the frame body plate 41. The second guide member 42a projects frontward from the frame body plate 41 at another side of the lateral sides of the frame body plate 41.

The inclination holders 32a, 32b and the guide members 42a, 42b are brought into contact with each other when the imager attachment member 30 and the support frame 40 are assembled. To be more specific, the first inclination holder 32a and the first guide member 42a are brought into contact with each other, and the second inclination holder 32b and the second guide member 42b are brought into contact with each other. The inclination holders 32a, 32b and the guide members 42a, 42b hold the position of the image scanner 20 at various angles with frictional forces produced between the inclination holders 32a, 32b and the guide members 42a.

As shown in FIG. 6, first engagement members 60 made of resin are fixed to the imager attachment member 30 at two locations, which include a location at an upper portion of a front surface of the imager attachment member 30 and a location on a lower surface of a projecting plate 33 formed integrally with the body plate 31. One of the first engagement members (60b) is fixed on a back side of the projecting plate 33, which cannot actually be seen at the illustrated angle of FIG. 6. As shown in FIG. 7, second engagement members 70 made of resin are fixed to the support frame 40 at two locations, which include a location at an upper portion of a front surface of the support frame 40 and a location on an upper surface of a projecting plate 43 formed integrally with the frame body plate 41.

As shown in FIG. 6, each of the first engagement members 60 includes a first engagement part 61 in the form of a projection. As shown in FIG. 7, each of the second engagement members 70 includes a second engagement part 71 having spring characteristics. The second engagement part 71 receives and engages with the corresponding first engagement part 61.

When the image scanner 20 is rotated into the furthest front position, the first engagement member 60a engages with the second engagement member 70a in a detachable manner to hold the posture of the image scanner 20. As shown in FIG. 3, when the image scanner 20 is rotated into the furthest rear position, the first engagement member 60b engages with the second engagement member 70b in a detachable manner to hold the posture of the image scanner 20.

Thus, in the present embodiment, the image scanner 20 is supported in a state in which the image scanner 20 can be rotated about the horizontal axis. The readable area of the image scanner 20 can be moved in the vertical direction by rotating the image scanner 20. Therefore, the structure of the apparatus can be simplified and reduced in size without any lifting mechanism, which would be likely to increase the complexity and the size of the structure of the apparatus. Accordingly, the cost of the apparatus can be reduced.

In the present embodiment, the image scanner 20 itself is not moved in the vertical direction. Therefore, as shown in FIG. 4, a space X located below the image scanner 20 can be used for other purposes, for example, placing a basket or the like. Thus, spaces around the apparatus can effectively be utilized. In contrast, if the image scanner 20 itself is lifted and lowered, then a basket or the like can be placed only on a front side of the line Y indicated in FIG. 4. In the present embodiment, as shown in FIG. 1, the towel reception portion 84 is provided below the image scanner 20. However, if the space X located below the image scanner 20 is used for placing a basket or the like, then the towel reception portion 84 may be eliminated.

In the above embodiment, the inclination holders 32, the guide members 42, the first engagement members 60, and the second engagement members 70 have been described as a specific example of a mechanism for controlling a rotational position of the image scanner 20. However, the mechanism capable of rotating the image scanner 20 within a certain range and holding the image scanner 20 at any position within the rotatable range is not limited to the aforementioned mechanism. For example, a mechanism for holding the image scanner 20 at any position within the rotatable range may be provided on the axial member 50 as a rotation axis.

The aforementioned embodiment has been applied to a stationary scanner used for an item registration operation in a POS system in which a store clerk conducts an item registration operation of registering items to be purchased by customers while another store clerk conducts a checkout operation. Nevertheless, the present invention may be applied to other stationary scanners, such as a self-scanning apparatus that requires a customer to conduct an item registration operation.

What is claimed is:

1. A stationary scanner apparatus comprising:
   an image scanner operable to read an item code;
   an imager attachment member fixed to the image scanner;
   a support frame configured to support the imager attachment member in a state in which the image scanner and imager attachment member are rotatable about a horizontal axis with respect to the support frame; and
   a support portion fixed to the support frame,
   wherein the imager attachment member has a first plate-shaped inclination holder formed on one side of lateral sides of the imager attachment member and a second plate-shaped inclination holder formed on another side of the lateral sides of the imager attachment member,
   wherein the support frame has a first plate-shaped guide member arranged in contact with the first inclination holder and a second plate-shaped guide member arranged in contact with the second inclination holder,
   wherein a rotational position of the image scanner is held with a frictional force produced between the inclination holders and the guide members.

2. The stationary scanner apparatus as recited in claim 1, further comprising:
   a first engagement member fixed to the imager attachment member; and
   a second engagement member fixed to the support frame, the second engagement member engaging with the first engagement member in a detachable manner.

3. The stationary scanner apparatus as recited in claim 1, further comprising
   two first engagement members fixed to the imager attachment member; and
   two second engagement members fixed to the support frame,
   wherein one of the two first engagement members is provided so as to engage with one of the two second engagement members in a detachable manner when the image scanner is rotated into the furthest front position in a rotational direction of the image scanner, and
   the other first engagement member is provided so as to engage with the other second engagement member in a detachable manner when the image scanner is rotated into the furthest rear position in the rotational direction of the image scanner.

\* \* \* \* \*